(12) United States Patent
Yoshino

(10) Patent No.: US 9,303,668 B2
(45) Date of Patent: Apr. 5, 2016

(54) THIN JOINT MEMBER PRODUCING METHOD AND PAIR OF THIN JOINT MEMBERS

(75) Inventor: Masahiro Yoshino, Shizuoka (JP)

(73) Assignee: KABUSHIKI KAISHA YOSHINO KOSAKUJO, Shizuoka (JP)

( * ) Notice: Subject to any disclaimer, the term of this patent is extended or adjusted under 35 U.S.C. 154(b) by 975 days.

(21) Appl. No.: 13/504,241

(22) PCT Filed: Oct. 5, 2010

(86) PCT No.: PCT/JP2010/005952
§ 371 (c)(1),
(2), (4) Date: Apr. 26, 2012

(87) PCT Pub. No.: WO2011/055485
PCT Pub. Date: May 12, 2011

(65) Prior Publication Data
US 2012/0223518 A1 Sep. 6, 2012

(30) Foreign Application Priority Data
Nov. 6, 2009 (JP) .................................. 2009-254785

(51) Int. Cl.
*F16B 7/04* (2006.01)
*B21D 28/32* (2006.01)
*C21D 8/02* (2006.01)

(52) U.S. Cl.
CPC .............. *F16B 7/0486* (2013.01); *B21D 28/32* (2013.01); *C21D 8/0205* (2013.01)

(58) Field of Classification Search
CPC ......... F16B 7/04; F16B 7/0486; B21D 28/24; B21D 28/26; B21D 28/32; C21D 1/18; C21D 8/0205; C21D 8/0294; C21D 9/46
See application file for complete search history.

(56) References Cited

U.S. PATENT DOCUMENTS 2,909,281 A * 10/1959 Koskinen ........................ 72/377
3,365,926 A * 1/1968 Price .............................. 72/283
(Continued)

FOREIGN PATENT DOCUMENTS

EP             1795766 A1 * 6/2007 ................ F16B 7/04
JP        A-02-290922          11/1990
(Continued)

OTHER PUBLICATIONS

Oct. 25, 2011 International Preliminary Report on Patentability issued in International Patent Application No. PCT/JP2010/005952 (with translation).
International Search Report issued in Application No. PCT/JP2010/005952; Dated Nov. 2, 2010 (With Translation).

*Primary Examiner* — Edward Tolan
(74) *Attorney, Agent, or Firm* — Oliff PLC

(57) ABSTRACT

A method is provided for producing a joint member of a metal joint, such that reduction of assembly manhours and reduction of the thickness and weight can be achieved at the same time without reducing the strength of a product or increasing the cost of production. In the case of a nut-side thin joint member, a metal plate of boron steel obtained by adding boron to low-carbon steel is burred such that the resulting cylindrical body obtains a surface that is sufficient for threading, then a threaded portion having a plurality of threads is formed on that surface, after which, quenching is carried out to increase the strength of the threads so that a nut having sufficient strength can be integrally provided even though the thickness and weight of the joint member are reduced.

2 Claims, 2 Drawing Sheets

(56) References Cited

U.S. PATENT DOCUMENTS

| | | | |
|---|---|---|---|
| 3,513,684 A * | 5/1970 | Price | 72/340 |
| 3,769,103 A * | 10/1973 | Wardwell et al. | 148/573 |
| 3,860,351 A * | 1/1975 | Weiss et al. | 403/218 |
| 5,159,826 A * | 11/1992 | Miyazawa et al. | 72/358 |
| 5,295,390 A * | 3/1994 | Hosono | 72/334 |
| 6,413,326 B1 * | 7/2002 | Rallis | 148/220 |
| 6,742,374 B2 * | 6/2004 | Ozawa | 72/342.5 |
| 7,506,444 B2 * | 3/2009 | Weise | 29/897.2 |
| 2004/0187547 A1 * | 9/2004 | Ushida | 72/356 |

FOREIGN PATENT DOCUMENTS

| | | | | |
|---|---|---|---|---|
| JP | A-2000-046019 | | 2/2000 | |
| JP | A-2000-283123 | | 10/2000 | |
| JP | A-2001-173616 | | 6/2001 | |
| JP | A-2001-295511 | | 10/2001 | |
| JP | 2006-321405 A | * | 11/2006 | B60J 5/00 |

* cited by examiner

THIN JOINT MEMBER PRODUCING METHOD AND PAIR OF THIN JOINT MEMBERS

BACKGROUND OF THE INVENTION

1. Technical Field

The present invention relates to a pipe coupling metal joint which couples two pipes to each other in a manner that two pipes are held between a pair of joint members and the joint members are fastened to each other by a bolt and a nut through respective coupling holes thereof.

2. Related Art

As disclosed in a following Japanese Patent Document, in an existing metal joint, two pipes are held between a pair of joint members by engagement, a bolt is inserted through coupling holes of the pair of joint members, and the bolt is threaded into a nut so as to be fastened thereto, thereby coupling the pair of joint members to each other.

PATENT DOCUMENT

Patent Document 1: Japanese Patent Application Laid-Open Publication No. 2000-283123

DISCLOSURE OF THE INVENTION

Problem to be Solved by the Invention

Then, in the case of the related art, there is an advantage that the pair of joint members may have substantially the same structure. However, a problem arises in that a nut may be dropped during a coupling operation, and the related art is not contrived in consideration of the recent strong demand for decreasing the number of assembling steps.

On the other hand, a method may be supposed in which a nut is integrated with one joint member by welding or swaging. However, since it takes considerable efforts for the integration, a problem arises in that the cost increases.

Further, in recent years, there has been a demand for a decrease in thickness and weight of the joint with a view to reducing the material cost or the transportation cost. Then, there has been an attempt to make the thickness thinner than 2.6 mm of the related art by using high-tensile steel having a strength of about 980 MPa as a material. However, the thickness is thinned only by about 2 mm, and the joint member is bent with a large curvature at the time of bending. Accordingly, in the case of the high-tensile steel, the high-tensile steel may be cracked and the mold as one of production equipment is consumed intensively, so that it may not be used for a long period of time. For these reasons, the product using the high-tensile steel was not mass-produced.

Therefore, the invention is made to solve the above-described problems, and it is an object of the invention to provide a method of producing a joint member capable of decreasing the thickness thereof and sufficiently exhibiting a nut function in the nut-side thin joint member without degrading the product strength or increasing the cost.

SUMMARY OF THE INVENTION

Means for Solving Problem

Even in a case where one joint member equipped with a nut function is provided so as to remove a nut, when the thickness and weight of the joint member are decreased, a thin communication hole to be provided with a thread by squeezing and tapping may have low strength and the thread may be damaged due to the thin thickness. For this reason, when a decrease in thickness and weight of the joint member is prioritized, a nut-shaped member needs to be attached thereto by welding or swaging in the end, so that the problem in cost may not be solved.

According to the result of the inventor's trial and error, it is found that the above-described problems may be solved together by a configuration in which a specific material is used, a sufficient thread forming surface is ensured by burring, a plurality of thread ridges with sufficiently ensured thickness are formed in the thread forming surface by rolling tapping, and then the strength of the thread ridge is improved by quenching, and whereby the invention is contrived.

According to a first aspect, there is provided a method of producing a nut-side thin joint member of a pipe coupling metal joint for coupling two pipes to each other in a manner that the said two pipes are held between a pair of joint members by being fastened by a bolt and a nut, the method comprising: preparing a thin metal sheet, made of boron steel, or boron-bearing low-carbon steel as a material; forming a cylindrical body portion by performing burring on the thin metal sheet; forming a threaded part by performing rolling tapping on the said cylindrical body; and thereafter performing quenching on the threaded part to obtain a nut function.

According to a second aspect, there is provided a method of producing a bolt-side thin joint member of a pipe coupling metal joint for coupling two pipes to each other in a manner that the two pipes are held between joint members and a bolt and a nut are fastened to each other, the method comprising: preparing a thin metal sheet, made of boron steel, or boron-bearing low-carbon steel as a material; forming a coupling hole by performing perforating on the thin metal sheet; and performing quenching on the coupling hole part.

According to a third aspect, there is provided a method according to the first or second aspect, wherein a metal sheet having a thickness of 1.0 to 1.3 mm is used.

According to a fourth aspect, there is provided a method, according to the third aspect, the method is applied for producing a nut-side thin joint member, the thickness of the cylindrical body is set to be 0.8 mm or more, and the number of the thread ridges is set to be 3 to 3.5.

According to the aspect of claim 5, there is provided a pair of thin joint members comprising: a nut-side thin joint member and a bolt-side thin joint member which are produced by the method according to any one of the first to fourth aspects, wherein each joint member includes a recess portion, which is provided in a coupling portion between two pipe holding portions so as to be recessed toward the pipe holding side, a coupling hole for the bolt-side is formed so as to penetrate the recess portion, and a cylindrical body for the nut-side is formed upright inside the recess portion, and wherein the bolt-side thin joint member includes a penetration hole which is formed in the vicinity of the center of one holding portion side, and grooves respectively formed in the vicinity of both edges of the coupling portion, whereby the bolt-side joint member and the nut-side joint member may be easily distinguished from each other by the penetration hole and the grooves.

Effect of the Invention

According to the producing method of the invention, a decrease in thickness and weight of the joint member may be achieved without degrading the product strength or increasing the cost. The nut-side thin joint member may be formed in a nut-less manner.

Further, since the bolt-side thin joint member is provided with the penetration hole or the grooves, the bolt-side thin joint member and the nut-side thin joint member may be easily distinguished from each other.

DETAILED DESCRIPTION OF THE INVENTION

Figure 1:
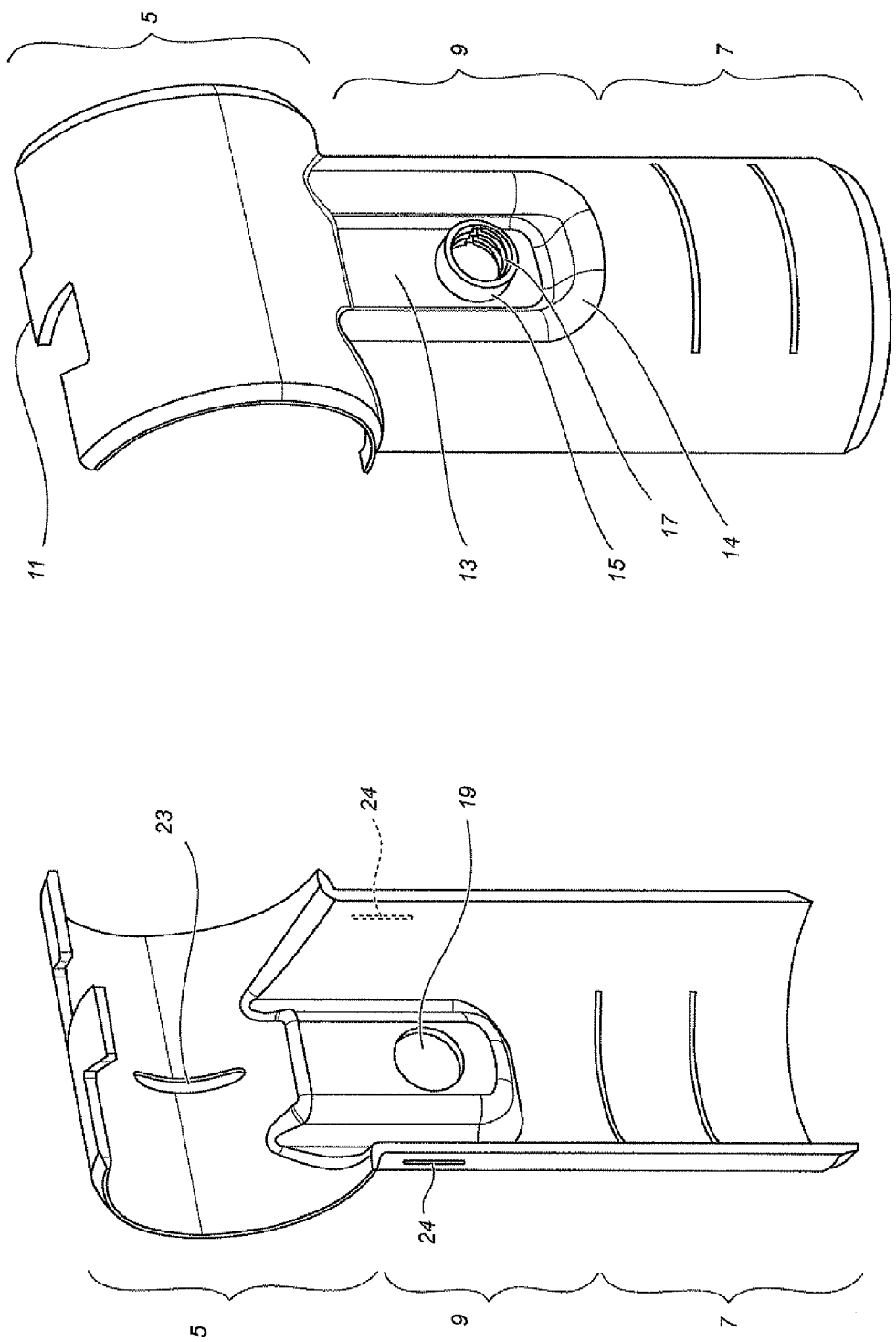
FIG. 1 is a perspective view illustrating a pair of thin joint members according to a first embodiment of the invention.

A metal joint member according to an embodiment of the invention will be described by referring to the drawings.

A nut-side thin joint member and a counter bolt-side thin joint member make a pair, so that a so-called metal joint is formed. FIG. 1 illustrates a nut-side thin joint member 1 and a counter bolt-side thin joint member 3.

Hereinafter, the nut-side thin joint member 1 will be first described.

As a material, a thin metal sheet is used which is made of boron steel, or boron-bearing low-carbon steel corresponding to S20C (ES standard). This boron steel includes carbon: 0.20 to 0.25 mass % and boron: 0.001 to 0.005 mass %, and may enjoy quenching effects. This boron steel s sufficiently soft such as to be about 130 Hv before quenching, and may ensure hardness of about 500 Hv at the strength of about 1600 MPa after quenching.

The thickness of the metal sheet as the material is from 1.0 to 1.3 mm, and the thickness in the embodiment is 1.2 mm. This falls to one-half of existing joint members which are made of a cold rolled steel sheet of a thickness of about 2.6 mm.

The nut-side thin joint member 1 includes a first holding portion 5, a second holding portion 7, and a coupling portion 9 which couples the first holding portion 5 and the second holding portion 7 to each other. The first holding portion 5 and the second holding portion 7 are respectively curved in a circular-arc shape from the same sheet surface, and follow curved surfaces of pipes to be held. An uneven portion 11 for engagement is formed in the axial end surface of the first holding portion 5.

The coupling portion 9 is formed as a curved surface which is curved in a circular-arc shape so as to be continuous to the second holding portion 7, and the end surface is coupled to the outer peripheral surface of the first holding portion 5. The coupling portion 9 is provided with a recess portion 13, and the recess portion 13 is recessed in the direction opposite to the curved side. An edge 14 of the recess portion 13 is substantially formed in a squared U-shape when seen from the second holding portion 7.

Figure 2:
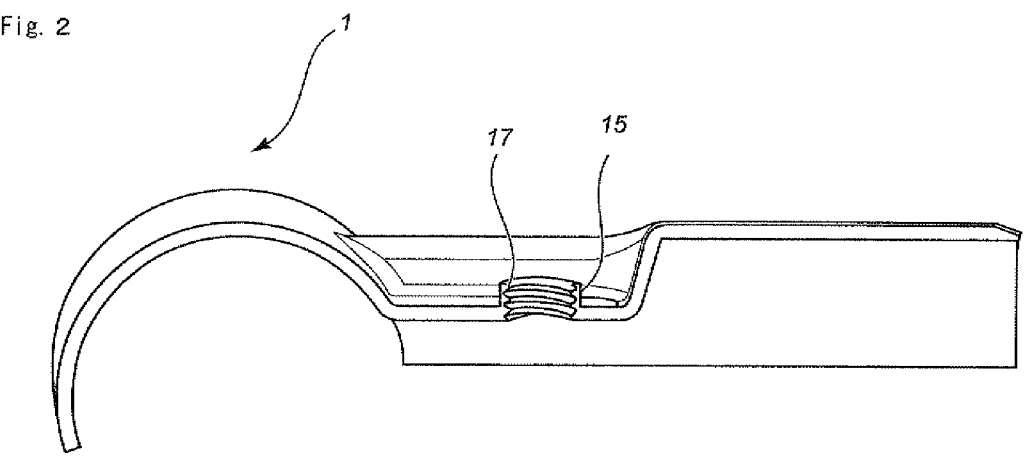
FIG. 2 is a cut-away view illustrating the nut-side thin joint member of FIG. 1.
Figure 3:
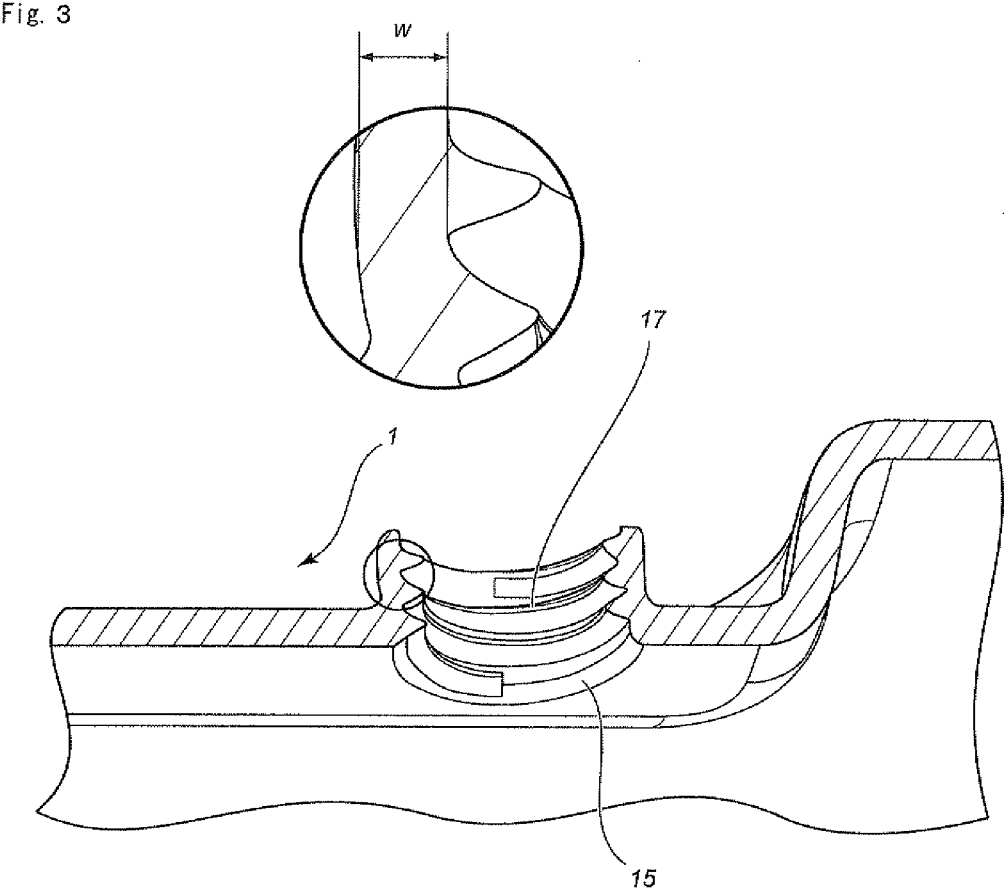
FIG. 3 is an enlarged cut-away view illustrating the nut-side thin joint member of FIG. 2.

A numeral 15 in FIGS. 2 and 3 denotes a short circular and cylindrical body, and the cylindrical body 15 is formed upright toward the recess portion 13 from the edge of the hole formed inside the recess portion 13. A threaded part 17 is formed in the inner surface of the cylindrical body 15.

The height of the inner peripheral surface of the cylindrical body 15 is set to be larger than the thickness of the nut-side thin joint member 1, and the inner peripheral surface is provided with a plurality of thread ridges adapted to the bolt which is used in this type of joint member. 3 to 3.5 ridges may preferably be formed, and in the embodiment, an example of three ridges is illustrated.

Further, the minimum thickness (w) of the cylindrical body 15 is preferably 0.8 mm or more, and in the embodiment, the thickness is 0.9 mm.

The nut-side thin joint member 1 is made of the above-described metal sheet. The metal sheet is first subjected to punching by a pressing machine so as to be substantially formed in a transverse Y-shape in an expanded state and is then subjected to bending so as to be formed in a three-dimensional shape.

With regard to the nut-side thin joint member 1, the cylindrical body 15 is formed in the recess portion 13 by burring, and the threaded part 17 is formed in the inner surface thereof by the rolling tapping.

After the threaded part 17 is formed, the nut-side thin joint member is subjected to quenching so as to improve the surface hardness or the strength.

In the producing method of the invention, the material needs to have sufficient extensibility at the stage of performing processing such as bending, burring, and rolling tapping on the material, but needs to have high surface hardness and strength as an end product. Since the above-described boron steel is used, the material may sufficiently withstand the above-described demands. Further, since the sufficient number of the thread ridges such as 3 (three) to 3.5 (three and half) of the thread ridges is ensured and the threaded part 17 is formed by rolling tapping, it is ensured that the minimum thickness (w) of the cylindrical body 15 is 0.8 mm or more, and hence the nut-side thin joint member may withstand the tightening torque (100 kg·cm) of the bolt in the practical use without any breakage.

Incidentally, for quenching, carbon steels need to include carbon: 0.40 mass % or more (S42C to 45 C). On the other hand, even S35C is fairly rigid such as to be about 150 Hy before quenching. That is to say, carbon steels are likely to be cracked when the above-described process is performed thereon.

In this way, being made of specific boron steel, the nut-side thin joint member 1 is practically be used.

The nut-side thin joint member 1 is used together with the counter bolt-side thin joint member 3. The bolt-side thin joint member 3 has the same shape as that of the nut-side thin joint member 1, but has a difference in that a coupling hole 19 is formed just by perforating instead of the cylindrical body 15. The bolt-side thin joint member 3 is produced by using the same material as that of the nut-side thin joint member 1. In the same way, a material of the same kind is subjected to punching and bending and is then subjected to perforating according to a determined method, Therefore, the same numerals will be given to the same parts in the drawings and the description, and there will be no give description for the bold-side joint member.

At the time of coupling two pipes to each other, the curved recessed surface of the nut-side thin joint member 1 and the curved recessed surface of the bolt-side thin joint member 3 are made to face each other, one pipe is held between the first holding portions 5 and 5, respectively, for the nut-side 1 and for the bolt-side 3, and then the other pipe is held between the second holding portions 7 and 7 respectively, for the nut-side 1 and for the bolt-side 3. Further, the nut-side thin joint member 1 and the bolt-side thin joint member 3 are engaged with each other by the uneven portion 11. In addition, a bolt is inserted from the coupling hole 19 of the bolt-side thin joint member 3, and is threaded into the threaded part 17 of the nut-side thin joint member 1 so as to be fastened.

The bolt-side thin joint member 3 is provided with an elongated hole(=penetration hole) 23 which extends in the vertical direction in the vicinity of the center of the first holding portion 5, and both edges of the coupling portion 9 are respectively provided with elongated grooves 24 which extend in the vertical direction.

Although the nut-side thin joint member 1 and the bolt-side thin joint member 3 have a similar shape, these joint members may be easily distinguished from each other by the elongated hole 23 and the grooves 24.

While the embodiment of the invention has been described, the specific configuration of the invention is not limited to the above-described embodiment, and any change in design made without departing from the spirit of the invention is also included in the invention.

For example, the joint member is not limited to the case where two pipes are coupled to each other in the intersection direction.

EXAMPLE 1

As a material, a metal sheet (thickness: 1.2 mm) made of boron steel (carbon: 0.20 to 0.25 mass % and boron: 0.001 to 0.005 mass %) was used so as to produce the nut-side thin joint member 1 with the above-described configuration. The thread ridge of the cylindrical body 15 of the nut-side thin joint member 1 was formed so as to have three ridges and a minimum thickness (w) of 0.8 mm. In the production, the commonly-used production equipment was employed, provided that the mold was corrected in thin size.

The result was heated inside an oxidization-free furnace at the heating temperature of 870 to 900° C. for 30 minutes, and was input to oil for quenching.

Then, according to the test of the nut-side thin joint member 1, the hardness of about 500 Hv was ensured with the strength of about 1600 MPa due to the quenching.

And the members are fastened to each other by a bolt-nut fastening type. If, according to the method of the invention, a pair of joint members is produced, the weight reduction effect is obtained as much as 60%, compared to the existing method. The production amount reached 1,600 tons in the year 2002 becomes 766 tons, which means that a weight reduction of as much as 834 tons is realized. This result clearly shows how the effect of weight reduction is significant.

Furthermore, in the method of the invention, specific steel is used as a material, and is further subjected to quenching. The material is thin, for example, 1.3 mm or less, that is, a sheet thickness corresponding to a half or less of the existing sheet thickness of 2.6 mm. As a result, this product may be sold approximately at the same price as that of the existing product, which solves the problem in the viewpoint of cost.

Further, recently, there has been a demand for the reduction of $CO_2$ due to environmental concerns. If the thickness and weight of all joint members are decreased based on the sales amount in 2002, 1,329 tons of $CO_2$ may be reduced per year as illustrated in Table 1.

TABLE 1

Production of Joint
Comparison of $CO_2$ Emission Amount (per Year)
(Except for Transportation Efficiency)

| | | | Existing Joint (2.6 mm) | | Joint of the Invention (1.2 mm) | | |
|---|---|---|---|---|---|---|---|
| | | $CO_2$ amount per unit | Annual Use Weight | Annual $CO_2$ Emission | Annual Use Weight | Annual Emission of $CO_2$ | |
| Raw Material Production | Steel Sheet (SPCC) | 1.52 kg-$CO_2$/kg | 1,671,280 kg | 2,540,346 kg-$CO_2$/y | 766,003 kg | 1,164,325 kg-$CO_2$/y | 46% |
| | Electrical Power Amount (Quenching: 115,200 kWh) | 0.41 kg-$CO_2$/kWh | | 000,000 kg-$CO_2$/y | | 46,886 kg-$CO_2$/y | |
| Total | | | | 2,540,346 kg-$CO_2$/y | | 1,211,211 kg-$CO_2$/y | 48% |
| | 50 kW 8 Days/Month Operation | 50 kW*24*8*12 | | 115,200 kWh/year | Difference | 1,329,134 kg-$CO_2$/y | Reduction by 52% |

Note:
$CO_2$ amount reduction amounts are also large due to lightening of hoop material and a pressed product, and moving process to the next process such as surface treatment thereof. Further, $CO_2$ amount reduction amounts are also large due to the weight decrease in a trolley, a shelf vehicle, or the like used in transportation equipment for moving and transporting a final product. But, the $CO_2$ amount reduction due to these effects is not considered here.

Further, the nut-side thin joint member made a pair with the bolt-side thin joint member 3 produced in the same way from the same material so as to hold two pipes by engagement and the pair of joint members were fastened by an M6 cap screw bolt. Then, the pair of joint members was not broken even at the tightening torque of 200 kg cm.

Industrial Applicability

Due to an increasing price of resources, a decrease in thickness and weight of a joint member becomes very important from the viewpoint of saving resources in Japan with fewer resources. In addition to this effect, a decrease in weight also affects the respective production processes (hoop material, pressing, quenching, surface treatment, finishing, and transportation of products), whereby the transportation equipment may be decreased in weight and the fuel efficiency may be improved.

Conventionally, a pair of joint members was produced from a cold rolled steel sheet (SPCC), and a nut was prepared.

REFERENCE NUMERALS

1: nut-side thin joint member
3: bolt-side thin joint member
5: first holding portion
7: second holding portion
9: coupling portion
11: uneven portion
13: recess portion
14: edge (of recess portion)
15: cylindrical body
17: threaded part
19: coupling hole
23: elongated hole
24: groove

The invention claimed is:
1. A method of producing a nut-side thin joint member of a pipe coupling metal joint for coupling two pipes to each other in a manner that the two pipes are held between a circular-arc shaped surface of the nut-side thin joint member and a circular-arc shaped surface of a bolt-side thin joint member, the surfaces each following curved surfaces of the pipes to be held, and fastened by a bolt and a nut, the method comprising:

preparing a thin metal sheet with thickness of 1.0 to 1.3 mm, made of boron steel, the thin metal sheet having 0.20 to 0.25 mass % of carbon and 0.001 to 0.005 mass % of boron;

bending the thin metal sheet into a three-dimensionally shaped, pre-joint member having the circular-arc shaped surface;

forming a cylindrical body portion in the pre-joint member by performing burring;

forming a threaded part having a thread ridge comprising 3 to 3.5 ridges by performing rolling tapping on the cylindrical body, so as to make a nut; and thereafter performing quenching on the pre-joint member, the pre-joint member being heated in a furnace at a temperature of 870° C. to 900° C., thereby forming the nut-side thin joint member with the threaded part, the thickness of the thread ridge being kept 0.8 mm or more.

2. The method of producing the thin joint member according to claim 1, wherein the nut-side thin joint member is formed to have a hardness of about 500 HV and a strength of about 1600 MPa.

* * * * *